United States Patent
Shibukawa et al.

(10) Patent No.: US 8,740,742 B2
(45) Date of Patent: Jun. 3, 2014

(54) RUNNING DEVICE FOR DUMP TRUCK

(75) Inventors: Takeshi Shibukawa, Tsuchiura (JP); Hayato Masuda, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 13/389,567

(22) PCT Filed: Aug. 20, 2010

(86) PCT No.: PCT/JP2010/064084
§ 371 (c)(1), (2), (4) Date: Feb. 8, 2012

(87) PCT Pub. No.: WO2011/024723
PCT Pub. Date: Mar. 3, 2011

(65) Prior Publication Data
US 2012/0142475 A1 Jun. 7, 2012

(30) Foreign Application Priority Data
Aug. 24, 2009 (JP) ................................ 2009-193307

(51) Int. Cl.
*F16H 57/04* (2010.01)
(52) U.S. Cl.
USPC ........................... 475/161; 475/149; 475/159
(58) Field of Classification Search
USPC ........ 475/149, 159, 161, 317; 180/372, 65.51
See application file for complete search history.

(56) References Cited

U.S. PATENT DOCUMENTS

| | | | | |
|---|---|---|---|---|
| 3,770,074 A | * | 11/1973 | Sherman | 180/65.6 |
| 4,437,530 A | * | 3/1984 | De Young et al. | 180/372 |
| 4,799,564 A | | 1/1989 | Iijima et al. | |
| 5,382,854 A | * | 1/1995 | Kawamoto et al. | 310/67 R |
| 5,928,099 A | | 7/1999 | Tsunemi | |
| 6,139,464 A | | 10/2000 | Roske | |

(Continued)

FOREIGN PATENT DOCUMENTS

| | | |
|---|---|---|
| JP | 62-221918 A | 9/1987 |
| JP | 2-53634 A | 2/1990 |

(Continued)

OTHER PUBLICATIONS

Machine translation of Murahashi, Running Driver of Working Vehicle, Feb. 5, 2009, 118 pages.*

(Continued)

*Primary Examiner* — Sherry Estremsky
*Assistant Examiner* — Lillian Nguyen
(74) *Attorney, Agent, or Firm* — Crowell & Moring LLP (57) ABSTRACT

A dump truck has a flange on an inner peripheral wall of a spindle. The flange arranges a support bearing for supporting a shaft. The spindle is formed of a chassis-side member and a reduction gear unit-side member joined together by welding. The chassis-side member is fixed on a chassis of the dump truck, and the reduction gear unit-side member is located closer to a side of the reduction gear unit than the chassis-side member. The reduction gear unit-side member is located on a side of an outer periphery of the shaft portion, where a distance to a coupling between the motor and shaft and a distance to a first sun gear between the reduction gear unit and shaft are equal to each other. On an inner peripheral wall of the reduction gear unit-side member, the flange is cast together with the reduction gear unit-side member.

6 Claims, 6 Drawing Sheets

(56) References Cited

U.S. PATENT DOCUMENTS

2004/0065169 A1* 4/2004 Ciszak et al. .................. 74/640
2005/0059523 A1 3/2005 Hasegawa et al.
2010/0140020 A1 6/2010 Murahashi

FOREIGN PATENT DOCUMENTS

| JP | 5-67526 U | 9/1993 |
| JP | 2006-264396 A | 10/2006 |
| WO | WO 2009/016884 | 2/2009 |
| WO | WO 2009/016884 A1 | 2/2009 |

OTHER PUBLICATIONS

Machine translation of Masuda, travel driving device of the dump truck, May 10, 2006, 47 pages.*

International Search Report dated Sep. 28, 2010 including English-language translation (Four (4) pages).

Supplemental European Search Report dated Apr. 29, 2013, seven (7) pages.

* cited by examiner

RUNNING DEVICE FOR DUMP TRUCK

TECHNICAL FIELD

This invention relates to a travel assembly to be mounted on a dump truck that transports crushed rocks or the like dug in a mine. In the travel assembly, a shaft for transmitting an output of a motor to a reduction gear unit is inserted through a spindle, and a bearing that supports the shaft at a position between the motor and the reduction gear unit is arranged on the spindle.

BACKGROUND ART

In a conventional travel assembly to be mounted on a dump truck, a spindle is inserted on a side of an inner periphery of a wheel on which a tire is to be mounted. Wheel bearings are arranged between an outer peripheral wall of the spindle and an inner peripheral wall of the wheel, whereby rotation of the wheel about the spindle is feasible.

A motor is located on a side of an axial end of the spindle. The shaft is connected to an output shaft of the motor such that the shaft can rotate integrally with the output shaft. This shaft is inserted on a side of an inner periphery of the spindle, and extends out from an axially opposite end of the spindle. A reduction gear unit is located on a side of the opposite end of the spindle. The shaft is connected to the reduction gear unit such that an output of the motor can be transmitted. An output side of the reduction gear unit is connected to the wheel such that an output can be transmitted. As a consequence, the output of the motor is transmitted in the order of the shaft, reduction gear unit and wheel so that the wheel rotates together with the wheel.

On a revolving shaft, a centrifugal force acts because of an offset of its center of gravity from its axis due to variations or the like in its manufacture. A revolution speed per unit time at which the shaft is broken by this centrifugal force is called "a critical revolution". As a technology that sets the critical revolution sufficiently higher than revolution speeds used in a travel assembly, in other words, as a technology that protects a shaft from breakage under centrifugal forces which occur corresponding to revolution speeds to be used, it has been conventionally adopted to interpose a support bearing between an opposite end portion (an end portion on the side of a reduction gear unit) of a spindle and a shaft such that the shaft is supported at a position between a motor and the reduction gear unit. The support bearing is fitted in a retainer secured on the opposite end portion of the spindle (see Patent Document 1).

As another technology for the prevention of breakage of a shaft under centrifugal forces, a shaft is formed hollow to reduce its weight, and hence to lower centrifugal forces (see Patent Document 2)

PRIOR ART DOCUMENTS

Patent Documents

Patent Document 1: US-A-2004-0065169
Patent Document 2: US-A-2005-0059523

DISCLOSURE OF THE INVENTION

Problem to be Solved by the Invention

In the above-mentioned conventional travel assembly, the reduction gear unit has an input-side, planetary gear mechanism including a sun gear with a shaft connected thereto (hereinafter called "the first planetary gear mechanism") and an output-side, planetary gear mechanism that transmits, to a wheel, power transmitted from the first planetary gear mechanism (hereinafter called "the second planetary gear mechanism"). As types of the arrangement of these first and second planetary gear mechanisms, there are a type that the second planetary gear mechanism and first planetary gear mechanism are arranged in this order in an axial direction away from the spindle (see Patent Document 1) and a type opposite to the first-mentioned type, that is, a type that the first planetary gear mechanism and second planetary gear mechanism are arranged in this order in an axial direction away from the spindle (see Patent Document 2). Compared with the former type, the latter type requires a longer shaft, and has a higher need for a support bearing.

As a technology different from that making use of a support bearing, there is also one that reduces the weight of a shaft to lower centrifugal forces as mentioned above. However, the adoption of the above-mentioned latter type as the type of arrangement of the first and second planetary gear mechanisms may be considered to result in such a case that centrifugal forces cannot be sufficiently lowered under the influence of the length of the shaft. Another case may also be considered, in which depending on revolution speeds to be used, centrifugal forces may not be sufficiently lowered irrespective of the type of arrangement of the first and second planetary gear mechanisms. It is, therefore, preferred to use a support bearing when safety is taken into consideration.

Concerning the support position of the shaft supported by the support bearing, the deflection amount of the shaft can be set equal by making equal the distance to the connected part between the motor and the shaft and the distance to the connected part between the reduction gear unit and the shaft. The support bearing is, however, located closer to the side of the reduction gear unit than the motor as the support bearing has conventionally be arranged on the end portion of the spindle as mentioned above. To make the amount of deflection of the shaft equal, it is necessary to have the bearing located on an inner side of the spindle, which is closer to the motor compared with the end portion of the spindle. There is also a need for a flange to arrange the support bearing either directly or via a retainer on the inner peripheral wall of the spindle. In the travel assembly, the axial length dimension of the spindle is as large as 1.5 to 1.7 m, and the spindle of this dimension is formed by casting. Upon arranging the flange on the inner peripheral wall of the spindle, it is desired to form the flange together with the spindle by casting. A spindle, however, becomes large if it is attempted to cast in its entirety while paying attention to provide it with strength sufficient to support a large load corresponding to a tire width in a large dump truck for mines. As a consequence, it becomes hardly possible to fully pour a molten metal into a mold portion corresponding to the flange, thereby making it difficult to achieve a yield sufficient to justify its commercial manufacture.

With the foregoing circumstances in view, the present invention has as an object thereof the provision of a travel assembly for a dump truck, which can facilitate to arrange, on an inner peripheral wall of a spindle, a flange by casting for the arrangement of a bearing that supports a shaft located between a motor and a reduction gear unit.

Means for Solving the Problem

To achieve the above-mentioned object, the present invention is constructed as will be described next.

[1] A travel assembly according to the present invention for a dump truck is characterized in that in the travel assembly having a wheel on which a tire is to be mounted, a spindle inserted on a side of an inner periphery of the wheel, wheel bearings arranged between an outer peripheral wall of the spindle and an inner peripheral wall of the wheel to enable rotation of the wheel about the spindle, a motor arranged on a side of an end of the spindle, a shaft non-rotatably connected to an output shaft of the motor, inserted on a side of an inner periphery of the spindle and extending out from an opposite end of the spindle, a reduction gear unit arranged on a side of the opposite end of the spindle and interposed between the shaft and the wheel to transmit power from the shaft to the wheel, and a support bearing arranged on the spindle and supporting the shaft thereon, the spindle comprises a chassis-side member to be fixedly secured on a chassis of the dump truck and a reduction gear unit-side member located on a side closer to the reduction gear unit than the chassis-side member, the reduction gear unit-side member is located surrounding a portion of the shaft, at which a distance to a connected part between the motor and the shaft and a distance to a connected part between the reduction gear unit and the shaft become equal to each other, and on an inner peripheral wall of the reduction gear unit-side member, a flange for the arrangement of the support bearing has been formed together with the reduction gear unit-side member by casting.

In the travel assembly as described above in [1], the spindle comprises the chassis-side member and reduction gear unit-side member joined together, and on the inner peripheral wall of the reduction gear unit-side member as one of these members, the flange is formed for the arrangement of the support bearing by casting together with the reduction gear unit-side member. Specifically described, at the stage of the reduction gear unit-side member smaller in dimensions than the entirety of the spindle, the flange is formed by casting together with the reduction gear unit-side member. It can, therefore, be facilitated to arrange the flange on the inner peripheral wall of the spindle by casing for the arrangement of the support bearing.

[2] The travel assembly according to the present invention may also be characterized in that in the travel assembly as described above in [1], the spindle is formed, as an entirety thereof, of a motor accommodating section, which is of a substantially frusta-conical, hollow form tapered from the chassis toward the reduction gear unit and accommodates the motor inserted from a side of the output shaft thereof and a shaft accommodating section, which is of a substantially cylindrical form extending from an outboard end portion of the motor accommodating section in a direction toward the reduction gear unit and accommodates the shaft inserted and extending therethrough, the wheel bearings is located on an outer peripheral wall of the shaft accommodating section, the chassis-side member is a section of the entirety of the spindle, said section including the motor accommodating section, and the reduction gear unit-side member is a member of the shaft accommodating section, which is located on a side of the reduction gear unit relative to a position between the wheel bearings and the motor accommodating section.

According to the travel assembly as described above in [2], the reduction gear unit-side member is the member out of the shaft accommodating section, which is located on the side of the reduction gear unit relative to the position between the wheel bearings and the motor accommodating section, specifically the substantially cylindrical member out of the spindle, so that the reduction gear unit-side member can be formed with ease compared with the case in which it is the substantially frusto-conical section. Further, a joint between the chassis-side member and the reduction gear unit-side member is located between the wheel bearings and the motor accommodating section, in other words, avoids overlapping the wheel bearings in a radial direction of the spindle. It is, therefore, possible to control small a stress that occurs at the joint under a load which the spindle receives from the wheel bearings.

[3] The travel assembly according to the present invention may also be characterized in that in the travel assembly described above in [1] or [2], the reduction gear unit has a first planetary gear mechanism including a sun gear with the shaft connected thereto and a second planetary gear mechanism for transmitting, to the wheel, power transmitted from the first planetary gear mechanism, and these first and second planetary gear mechanisms are arranged in an order of the second planetary gear mechanism and the first planetary gear mechanism in an axial direction away from the spindle, a carrier in the second planetary gear mechanism is located on a side of the spindle, insertion holes are formed extending in the axial direction through the carrier and a sun gear in the second planetary gear mechanism, respectively, and the shaft is non-rotatably connected to the sun gear in the first planetary gear mechanism in a state that the shaft is inserted and extending through the insertion holes, and a carrier in the first planetary gear mechanism is non-rotatably fixed relative to the wheel, a ring gear in the first planetary gear mechanism is rotatable relative to the wheel and is non-rotatably connected to the sun gear in the second planetary gear mechanism, the carrier in the second planetary gear mechanism is non-rotatably connected to the spindle, and a ring gear in the second planetary gear mechanism is non-rotatably fixed relative to the wheel.

In the travel assembly as described above in [3], a reaction force occurs, in a direction opposite to rotation of the ring gear in the first planetary gear mechanism, on the spindle of each planetary gear in the first planetary gear mechanism. This reaction force coincides with the direction in which the wheel is to be rotated. As a consequence, the load to be applied to the reduction gear unit can be decreased compared with a case in which the arrangement of the first and second reduction gear units are opposite to that in the reduction gear unit in the present invention.

[4] The travel assembly according to the present invention may also be characterized in that in the travel assembly described above in [3], a cooling circuit is arranged to recover, cool and re-supply lube oil supplied to the wheel bearings and reduction gear unit, the carrier in the second planetary gear mechanism has a cylindrical extension forming therein the insertion hole through which the spindle is inserted, and the flange is provided with a suction pipe routed out from the side of the inner periphery of the spindle to a space on a side of the outer periphery of the spindle and on a side of the wheel bearings to recover the lube oil into the cooling circuit and a discharge pipe inserted in the insertion hole formed in the carrier in the second planetary gear mechanism to discharge the lube oil cooled by the cooling circuit.

According to the travel assembly as described above in [4], the lube oil supplied to the wheel bearings and reduction gear unit is recovered, cooled and re-supplied by the cooling circuit, and therefore, a contribution can be made to the prevention of malfunction and seizure of the reduction gear unit. As the cooled lube oil is supplied to the reduction gear unit, it is unnecessary to rely upon the amount of lube oil to compensate for a deterioration in the lubrication performance of the lube oil due to overheating of the lube oil. Therefore, the level height of the lube oil in which the reduction gear unit is to be immersed can be set lower, in other words, the amount of the lube oil to be used for the lubrication of the reduction gear unit can be decreased. In addition, the lube oil can be effectively discharged through the insertion hole to the side of the reduction gear unit owing to the insertion of the discharge pipe in the cylindrical extension.

It is to be noted that the construction of the cooling circuit in the travel assembly as described above in [4] has been realized by the facilitation of the insertion of the cylindrical extension, which is arranged on the carrier in the second planetary gear mechanism, into the spindle, because unlike conventional travel assemblies, it has become no longer necessary to arrange a retainer on a reduction gear unit-side end portion of the spindle for the arrangement of the support bearing owing to the arrangement of the support bearing on the flange and the location of the support bearing on the side of the inner periphery of the spindle.

Advantageous Effects of the Invention

According to the present invention, it is possible to arrange the flange on the inner peripheral wall of the spindle by casting for the arrangement of the bearing (support bearing) which serves to support the shaft at its portion located between the motor and the reduction gear unit. The travel assembly having the flange on the inner peripheral wall of the spindle for the arrangement of the support bearing can be provided with an improved yield, thereby making it possible to contribute to the commercial manufacture of the travel assembly having the flange.

BRIEF DESCRIPTION OF THE DRAWINGS

FIGS. 5(a) and 5(b) are simplified diagrams illustrating manners of operation of the first and second planetary gear mechanisms during travel of the dump truck, in which FIG. 5(a) illustrates the manner of operation of the first planetary gear mechanism and FIG. 5(b) illustrates the manner of operation of the second planetary gear mechanism.

MODES FOR CARRYING OUT THE INVENTION

With reference to FIGS. 1 through 6, a description will be made about the travel assembly according to the embodiment of the present invention.

Figure 1:
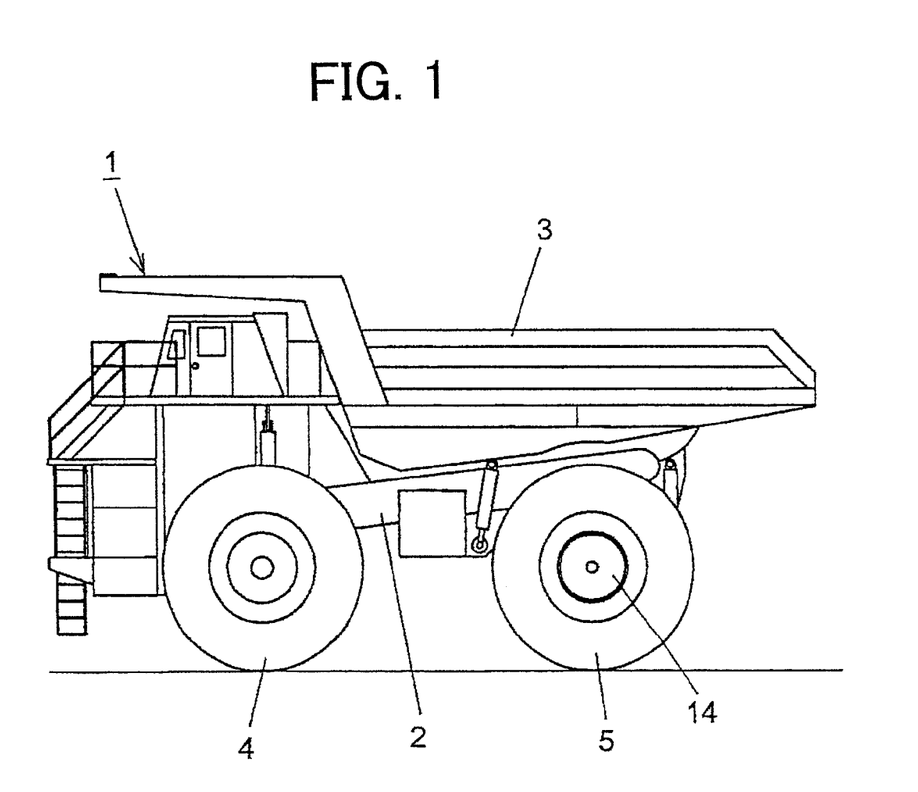
FIG. 1 is a left side view of a dump truck on which a travel assembly according to an embodiment of the present invention can be mounted.
Figure 2:
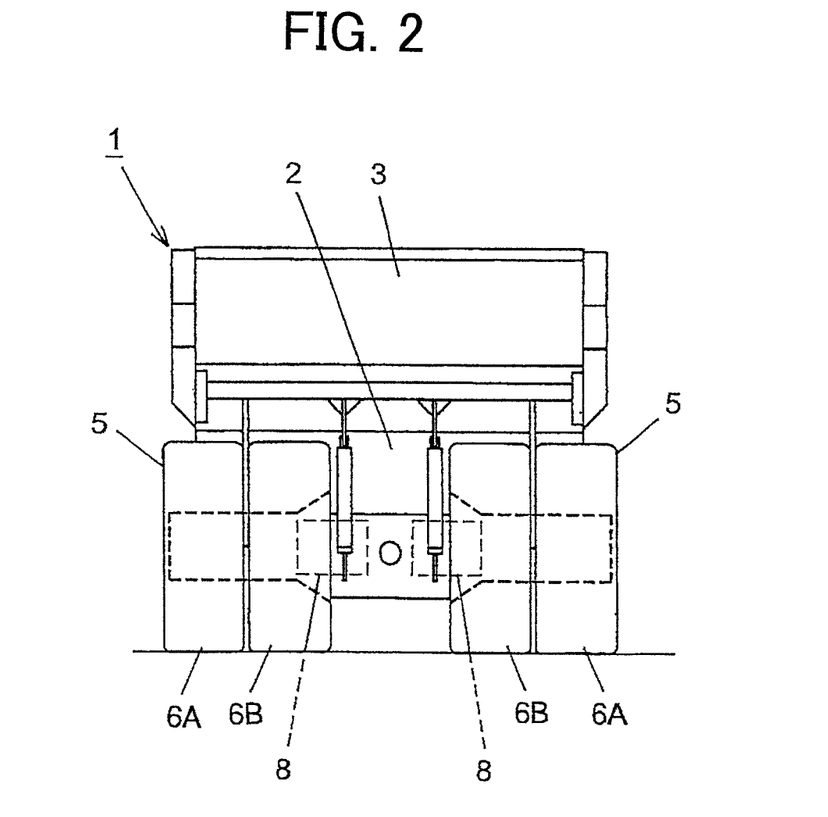
FIG. 2 is a rear view of the dump truck shown in FIG. 1.

The dump truck 1 shown in FIG. 1 is used to transport crushed rocks or the like dug in a mine, and is a large one with a payload capacity of more than 100 tons. This dump truck 1 has a chassis 2 as a main body, a vessel tiltably mounted on the chassis, and front wheels 4 and rear wheels 5 supporting the chassis 2 such that the chassis 2 can travel.

Left and right, rear wheels 5 are both provided with travel assemblies 7 according to the embodiment of the present invention, respectively, whereby the left and right, rear wheels 5 can be driven respectively. Numeral 8 in FIG. 2 designates motors arranged in the respective travel assemblies. The motors 8 are inserted and arranged from inboard sides of the respective rear wheels 5 as viewed in a transverse direction of the chassis 2. The motors 8 are electric motors, and are rotationally driven with a supply of electric power generated by a diesel engine 19 (shown in FIG. 6) mounted on the dump truck 1.

Figure 3:
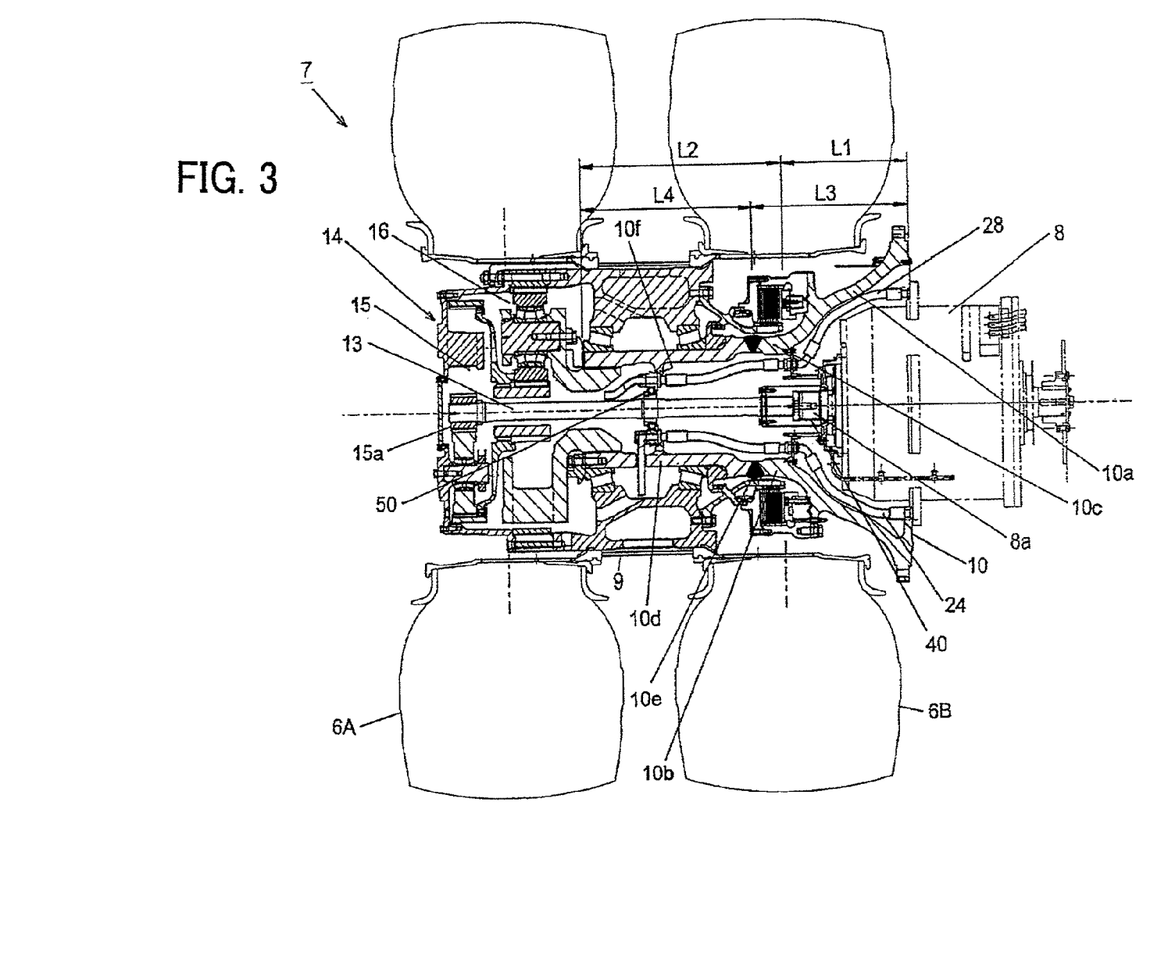
FIG. 3 is an enlarged cross-sectional view of the travel assembly according to the embodiment of the present invention.

As depicted in FIG. 3, each rear wheel 5 is comprised of tires 6A, 6B making up double tires and a wheel 9 with these tires 6A, 6B mounted thereon.

Also depicted in FIG. 3, the travel assembly 7 has the above-described wheel 9, a spindle 10 inserted on a side of an inner periphery of the wheel 9 and non-rotatably fixed on the chassis 2, and two wheel bearings 11,12 arranged side by side in an axial direction of the spindle 10 between an outer peripheral wall of the spindle 10 and an inner peripheral wall of the wheel 9 to enable rotation of the wheel 9 about the spindle 10.

The travel assembly 7 also has the above-described motor 8 arranged on a side of an axial end of the spindle 10 and fixedly secured relative to the chassis 2, a shaft 13 non-rotatably connected to an output shaft 8a of the motor 8 via a coupling 40, inserted on a side of an inner periphery of the spindle 10 and extending out from an axial opposite end of the spindle 10, and a reduction gear unit 14 arranged on a side of the opposite end of the spindle 10 and interposed between the shaft 13 and the wheel 9 to transmit power from the shaft 13 to the wheel 9.

The reduction gear unit 14 has a first planetary gear mechanism 15 and a second planetary gear mechanism 16. These first planetary gear mechanism 15 and second planetary gear mechanism 16 are arranged in an order of the first planetary gear mechanism 15 and second planetary gear mechanism 16 in an axial direction away from the spindle 10.

Figure 5A:
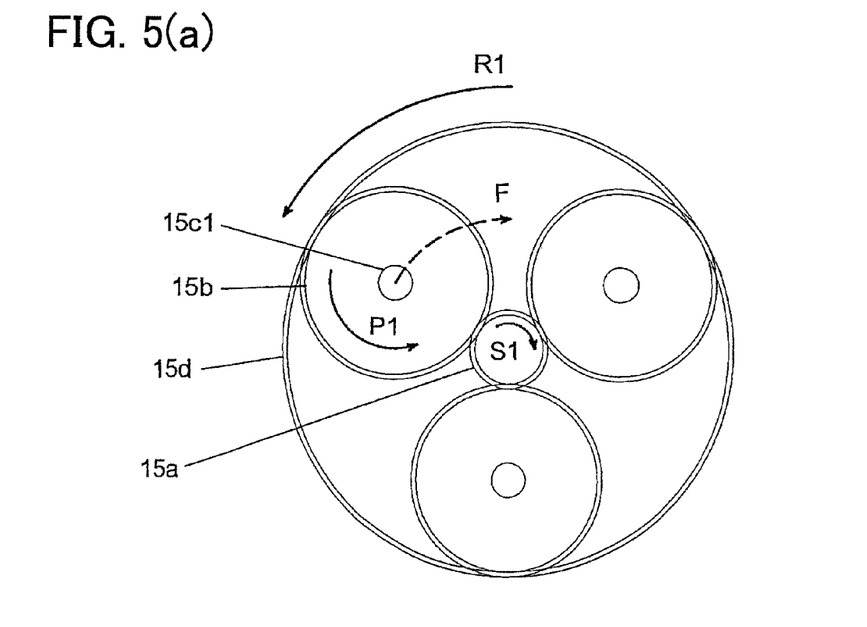

The first planetary gear mechanism 15 has a first sun gear 15a, three first planetary gears 15b arranged in meshing engagement with the first sun gear 15a (see FIG. 5(a)), a first carrier 15c on which three spindles 15c1 (see FIG. 5(a)) are arranged while rotatably supporting the first planetary gears 15b via two bearings 15c2,15c3, respectively, and a first ring gear 15d arranged in meshing engagement with the three first planetary gears 15b.

The first carrier 15c is non-rotatably fixed on a hub 17 by plural bolts 17a. This hub 17 is fastened together with a second ring gear 16d, which will be described subsequently herein, on the wheel 9 by plural bolts 17b. Therefore, the first carrier 15c is non-rotatably fixed relative to the wheel 9.

On a first ring gear 15d, a coupling 18 is fixed by bolts 18a.

Figure 5B:
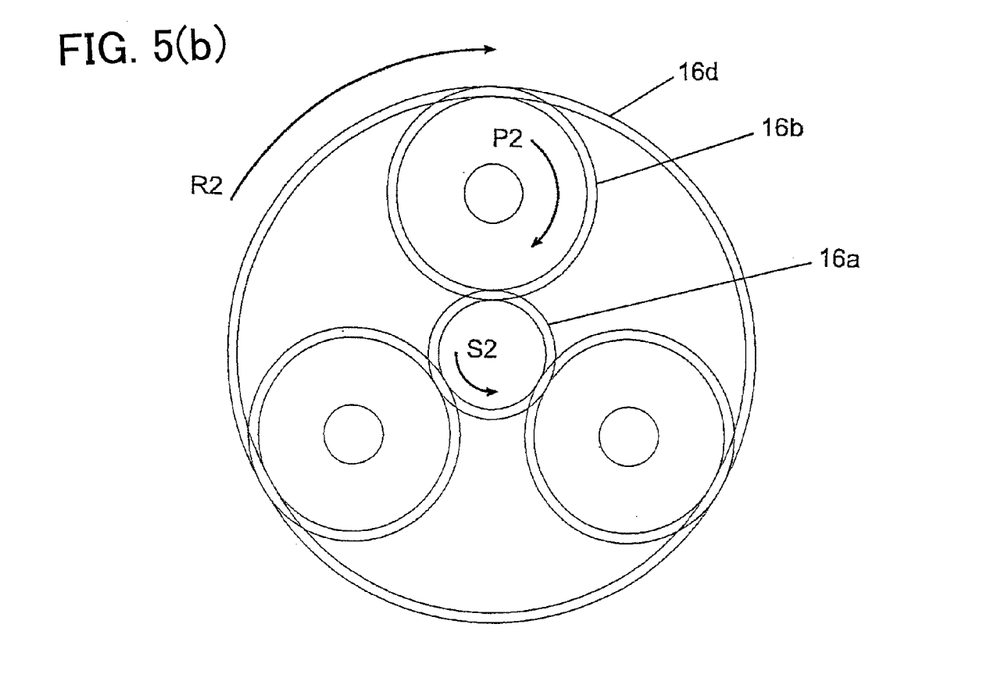

The second planetary gear mechanism 16 has a second sun gear 16a splined to the coupling 18, three second planetary gears 16b (see FIG. 5(b)) arranged in meshing engagement with the second sun gear 16a, a second carrier 16c on which three spindles 16c1 (see FIG. 5(b)) are arranged while rotatably supporting the second planetary gears 16b, respectively, via two bearings 16c2,16c3, and the second ring gear 16d arranged in meshing engagement with the three second planetary gears 16b.

The second carrier 16c has a cylindrical extension 16c4, which is formed at a radially inner position than the three spindles 16c1 and extends toward the spindle 10. This cylindrical extension 16c4 is inserted on the side of the inner periphery of the spindle 10 and is splined to the spindle 10.

The second ring gear 16d is fastened together with the hub 17 on the wheel 9 by the bolts 17b as mentioned above, and is non-rotatably fixed relative to the wheel 9.

The first carrier 15c, hub 17 and second ring gear 16d constitute a cover that covers the reduction gear unit 14 on the side of the opposite end of the spindle 10.

Through the second carrier 16c and second sun gear 16a, insertion holes 16a1,16c8 are formed extending in the axial direction, respectively. The shaft 13, which extends out on the opposite end of the spindle 10, is non-rotatably connected to the first sun gear 15a in the state that the shaft 13 is inserted and extending through the insertion holes 16a1,16c8.

The reduction gear unit 14 constructed as described above operates as will be described next.

When the shaft 13 rotates together with the output shaft 8a of the motor 8, the first sun gear 15a rotates together with the shaft 13 in the first planetary gear mechanism 15. The rotation of the first sun gear 15a is transmitted to the first planetary gears 15b. As the first carrier 15c with the first planetary gears 15b supported thereon is fixed non-rotatably relative to the wheel 9, the three first planetary gears 15b rotate about their own axes, respectively, while revolving around the first sun gear 15a and rotating the wheel, and transmit the rotation of the first sun gear 15a to the first ring gear 15d. As a result, the first ring gear 15d rotates.

When the first ring gear 15d rotates as described above, the second sun gear 16a rotates together with the first ring gear 15d and coupling 18 in the second planetary gear mechanism 16. The rotation of the second sun gear 16a is transmitted to the three second planetary gears 16b. As the second carrier 16c with these second planetary gears 16b supported thereon is connected non-rotatably to the spindle 10, the second planetary gears 16b rotate about their axes, respectively, without revolving around the second sun gear 16a, and transmit the rotation of the second sun gear 16a to the second ring gear 16d. The second ring gear 16d is integrally fixed to the wheel 9 and first carrier 15c, and therefore, rotates together with these wheel 9 and first carrier 15c. It is to be noted that the second planetary gears 16b may be arranged as many as four.

As a result of the transmission of the rotation of the shaft 13 to the wheel 9 via the first planetary gear mechanism 15 and second planetary gear mechanism 16 as described above, the rear wheel 5 of the dump truck 1 is driven.

As illustrated in FIGS. 5(a) and 5(b), when the first ring gear 15d rotates, for example, in a direction of arrow R1 during travel of the dump truck 1, a reaction force F (dashed line) occurs opposite to the rotation on the spindle 15c1 of each first planetary gear 15b in the first planetary gear mechanism. This reaction force F coincides with the direction of rotation of the wheel 9, that is, the direction of rotation of the second ring gear 16d (a direction of arrow R2). In FIG. 5(a), S1 indicates the direction of rotation of the first sun gear 15a in the first planetary gear mechanism 15, while P1 designates the direction of rotation of each first planetary gear 15b. In FIG. 5(b), on the other hand, S2 indicates the direction of rotation of the second sun gear 16a in the second planetary gear mechanism 16, while P2 designates the direction of rotation of each second planetary gear 16b.

In the travel assembly 7 according to this embodiment, particularly the spindle is formed, in its entirety, of a motor accommodating section 10a and a shaft accommodating section 10b. The motor accommodating section 10a is of a substantially frusto-conical, hollow form tapered from the chassis 2 toward the reduction gear unit 14 and accommodates the motor 8 inserted from a side of the output shaft 8a thereof.

The shaft accommodating section 10b is of a substantially cylindrical form extending from an outboard end portion of the motor accommodating section 10a in a direction toward the reduction gear unit 14 and accommodates the shaft 13 inserted and extending therethrough. The above-mentioned wheel bearings 11,12 are located on an outer peripheral wall of the shaft accommodating section 10b. The motor accommodating section 10a takes up an axial range L1 of the entirety of the spindle 10, while the shaft accommodating section 10b takes up an axial range L2 of the entirety of the spindle 10.

This spindle 10 is formed of a chassis-side member 10c and a reduction gear unit-side member 10d joined together. The chassis-side member 10c takes up an axial range L3 of the entirety of the spindle 10, and is to be fixedly secured on the chassis 2 of the dump truck 1. The reduction gear unit-side member 10d is located on a side closer to the reduction gear unit 14 than the chassis-side member 10c, specifically takes up an axial range L4 of the entirety of the spindle 10. The joining between the chassis-side member 10c and the reduction gear unit-side member 10d can be achieved by a method such as, for example, welding. Designated at numeral 10e in FIG. 3 is a joint between the chassis-side member 10c and the reduction gear unit-side member 10d.

The chassis-side member 10c is a section of the entirety of the spindle 10, which includes the motor accommodating section 10a.

The reduction gear unit-side member 10d is a member, which is located on the side of the reduction gear unit relative to a position between the wheel bearings 11,12 and the motor accommodating section 10a in the entirety of the spindle 10. This member is arranged to surround a portion of the shaft 13, at which a distance to a connected part between the output shaft 8a of the motor 8 and the shaft 13, that is, to the coupling 40 and a distance to a connected part between the reduction gear unit 14 and the shaft 13, that is, to the first sun gear 15a become equal to each other.

On an inner peripheral wall of the reduction gear unit-side member 10d, a flange 10f for the arrangement of the support bearing 50 has been formed together with the reduction gear unit-side member 10d by casting. The support bearing 50 supports the shaft 13 at a portion thereof, which is located between the coupling 40 and the first sun gear 15a. The location of the flange 10f is set such that the support bearing 50 can be secured in a neighborhood of a center of a range from the coupling 40 to the first sun gear 15a. The support bearing 50 is fitted in a retainer 51 secured on the flange 10f.

The reduction gear unit 14 is a state immersed in lube oil. The spindle 10 is provided with an oil inlet hole 10d1 formed to guide lube oil, which has flowed into the spindle 10, to a space 31 surrounded by the spindle 10, wheel 9 and two bearings 11,12. It is to be noted that in FIG. 4, sign "L" indicates the level height of the lube oil when the rear wheel 5 is in a stopped state.

Figure 6:
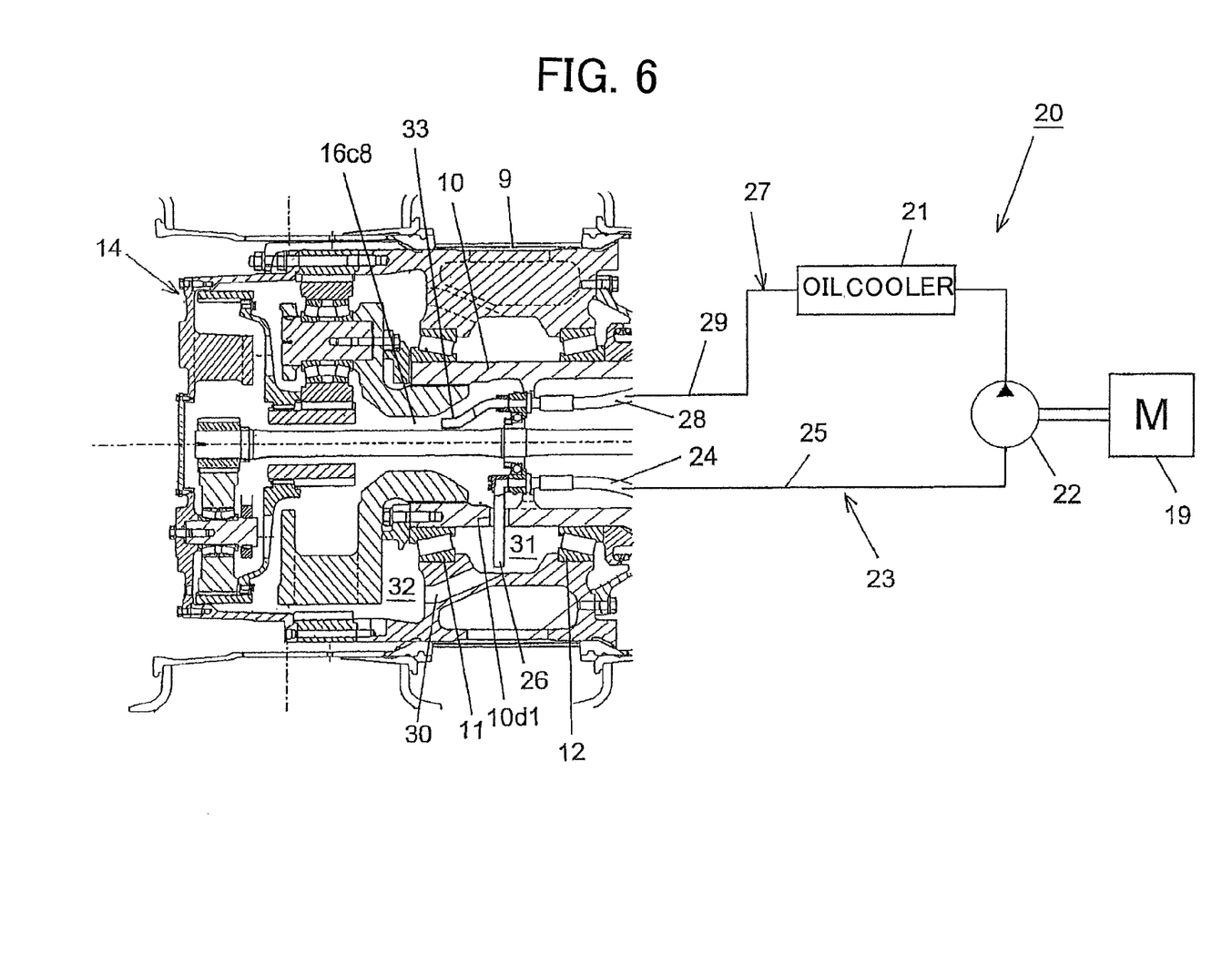
FIG. 6 is a hydraulic circuit diagram showing a cooling circuit arranged in the travel assembly according to the embodiment of the present invention for the dump truck of FIG. 1.

As shown in FIG. 6, the travel assembly 7 is provided with a cooling circuit 20 for cooling lube oil. This cooling circuit 20 has an oil cooler 21, a recovery oil passage 23 for recovering lube oil from the side of the reduction gear unit 14 and guiding it to the oil cooler 21, a re-supply oil passage 27 for guiding lube oil, which has been cooled by the oil cooler 21, to the reduction gear unit 14 from the side of the inner periphery of the spindle 10, and a pump 22 drivable by the diesel engine 19 to produce a flow of lube oil for its circulation through the cooling circuit 20.

The recovery oil passage 23 has an intra-spindle recovery line 24 inserted on the side of the inner periphery of the spindle 10, an extra-spindle recovery line 25 connecting the intra-spindle recovery line 24 and the oil cooler 21 with each other and provided with the pump 22, and a suction pipe 26 connected to an end portion of the intra-spindle recovery line 24, said end portion being on a side opposite to the oil cooler 21. This suction pipe 26 extends through the oil inlet hole 10*d*1 to a location radially outer than openings of the two bearings 11,12 on the side of the outer periphery of the spindle 10. The suction pipe 26 and intra-spindle recovery line 24 are connected to each other via the retainer 51. Through the retainer 51, a line 51*a* (through hole) is formed to communicate the suction pipe 26 and the intra-spindle recovery line 24 with each other.

The recovery oil passage 23 also has plural communication holes 30 through which a space 32 on the side of the reduction gear unit 14 and the space 31 between the two bearings 11,12 are communicated to each other. These communication holes 30 are formed through a section of the wheel 9, said section being located on the side of the outer peripheries of the two bearings 11,12.

Figure 4:
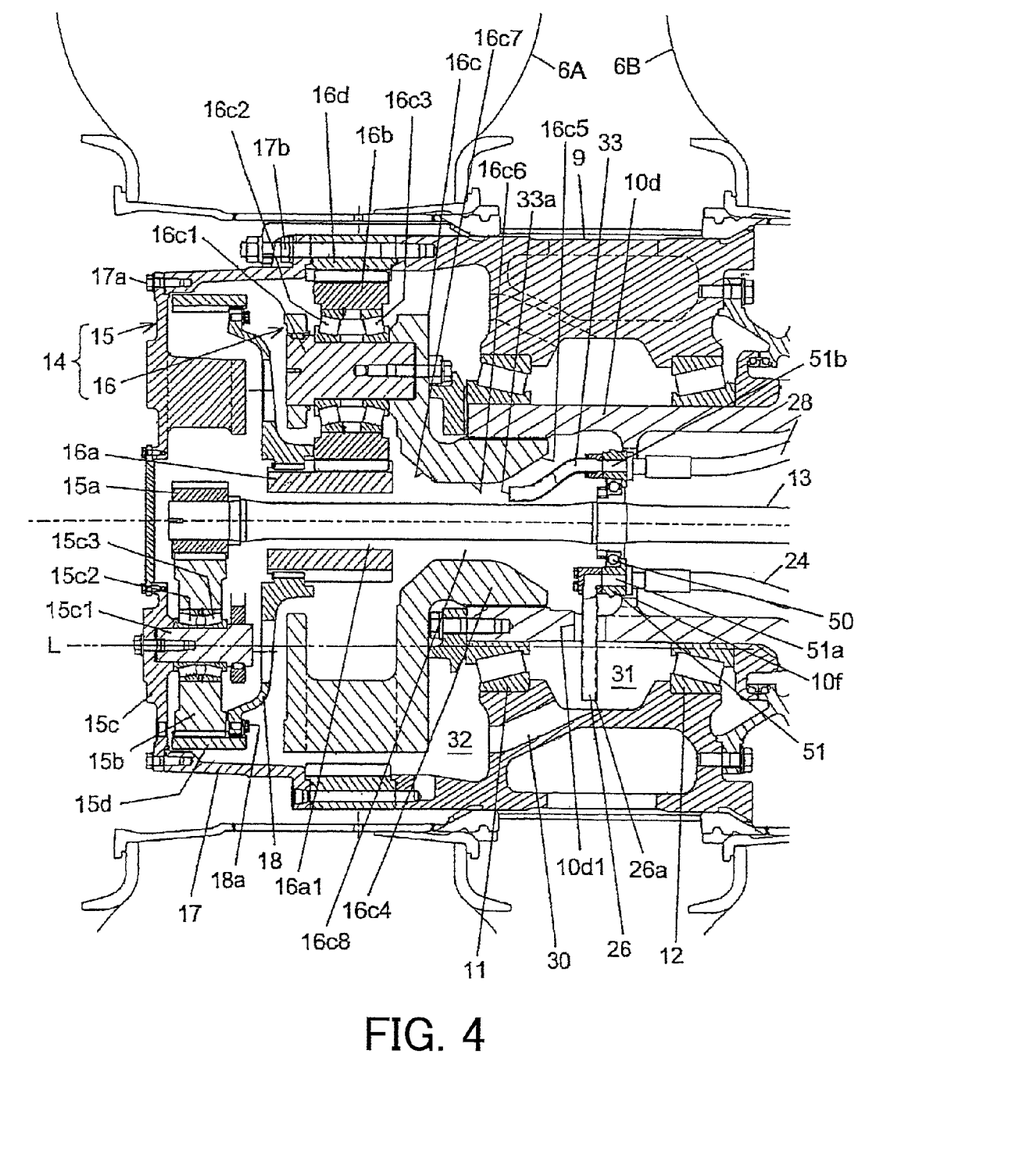
FIG. 4 is an enlarged cross-sectional view of a reduction gear unit, a reduction gear unit-side end portion of a spindle and surroundings of the end portion in the travel assembly depicted in FIG. 3.

During travel of the dump truck 1, the height position of the oil level becomes lower than the height L of the oil level depicted in FIG. 4 because centrifugal force and inertia force act on the lube oil. The location of a free end portion of the suction pipe 26, that is, a suction opening 26*a* is, therefore, set lower than the level height of the lube oil during travel of the dump truck 1. In other words, the suction pipe 26 is open at a position lower than the height position of the level of the lube oil during travel of the dump truck 1.

The re-supply oil passage 27 has an intra-spindle re-supply line 28 inserted to the side of the inner periphery of the spindle 10, an extra-spindle re-supply line 29 connecting the intra-spindle re-supply line 28 and the oil cooler 21 with each other, and a discharge pipe 33 connected to an end portion of the intra-spindle re-supply line 28, said end portion being on a side opposite to the side of the oil cooler 21. The discharge pipe 33 and the intra-spindle re-supply line 28 are connected to each other via the retainer 51. Through the retainer 51, a line 51*b* (through hole) is formed to communicate the discharge pipe 33 and the intra-spindle re-supply line 28 with each other.

The discharge pipe 33 is inserted in the insertion hole 16*c*8 defined by an inner wall of the cylindrical extension 16*c*4 of the second carrier 16*c*. The inner wall of the cylindrical extension 16*c*4 has a first frusto-conical wall portion 16*c*5 tapered in a direction toward a free end portion of the discharge pipe 33, that is, a discharge opening 33*a*, a cylindrical wall portion 16*c*6 extending from the first frusto-conical wall portion 16*c*5 in a direction toward the second sun gear 16*a*, and a second frusto-conical wall portion 16*c*7 flaring from the cylindrical wall portion 16*c*6 in a direction toward the second planetary gear mechanism 16. The discharge opening 33*a* of the discharge pipe 33 is located facing the cylindrical wall portion 16*c*6. This construction facilitates the guidance of the lube oil to the reduction gear unit 14 after its delivery from the discharge opening 33*a*.

The position of the above-mentioned flange 10*f* may desirably be set such that the support bearing 50 can be arranged at a center position of a range between the coupling 40 and the first sun gear 15*a*. In this embodiment, however, the position of the flange 10*f* is set in the neighborhood of the center position as a matter of convenience for a space in which the suction pipe 26 and discharge pipe 33 are arranged.

The cooling circuit 20 constructed as described above operates as will be described next.

During travel of the dump truck 1, the pump 22 is driven by the diesel engine 19 while electric power generated by the diesel engine 19 is supplied to the motor 8. In association with the drive of the pump 22, the lube oil accumulated within the space 31 between the two bearings 11,12 is drawn up through the suction pipe 26, is guided to the oil cooler 21 through the intra-spindle recovery line 24 and extra-spindle recovery line 25, and is then cooled there. Subsequently, the cooled lube oil is delivered from the oil cooler 21 through the extra-spindle re-supply line 29 and intra-spindle re-supply line 28, and is then re-supplied to the reduction gear unit 14 from the cylindrical extension 16*c*4 formed on the second carrier 16*c* in the second planetary gear mechanism 16.

As the space 32 on the side of the reduction gear unit 14 is in communication with the space 31 between the two bearings 11,12 through the communication holes 30, a portion of the lube oil supplied to the reduction gear unit 14 is guided to the space 31 and is drawn up again through the suction pipe 26. As described above, the lube oil in the reduction gear unit 14 is caused to circulate between the reduction gear unit 14 and the oil cooler 21 during operation of the diesel engine 19, that is, during travel of the dump truck 1.

According to the travel assembly 7 of this embodiment, the following advantageous effects can be brought about.

In the drive assembly 7, the spindle 10 is the combination of the chassis-side member 10*c* and the reduction gear unit-side member 10*d* joined together, and on the inner peripheral wall of the reduction gear unit-side member 10*d* as one of these members, the flange 10*f* for the arrangement of the support bearing 50 is formed together with the reduction gear unit-side member 10*d* by casting. Specifically described, at the stage of the reduction gear unit-side member 10*d* smaller in dimensions than the entirety of the spindle 10, the flange 10*f* is formed by casting together with the reduction gear unit-side member 10*d*. It can, therefore, be facilitated to arrange the flange 10*f* on the inner peripheral wall of the spindle 10 by casing for the arrangement of the support bearing 50.

According to the drive assembly 7, the reduction gear unit-side member 10*d* is a portion of the shaft accommodating section 10*b*, said portion being located on the side of the reduction gear unit-side member 10*d* relative to the position between the wheel bearings 11,12 and the motor accommodating section 10*a*, specifically the substantially cylindrical portion out of the spindle 10, so that the reduction gear unit-side member 10*d* can be formed with ease compared with the case in which it is the substantially frusto-conical section.

According to the drive assembly 7, the joint 10*e* between the chassis-side member 10*c* and the reduction gear unit-side member 10*d* is located between the wheel bearings 12 and the motor accommodating section 10*a*, in other words, avoids overlapping the wheel bearings 11,12 in the radial direction of the spindle 10. It is, therefore, possible to control small a stress that occurs at the joint 10*e* under a load which the spindle 10 receives from the wheel bearings 11,12.

In the travel assembly 7, the reaction force F occurs, in the direction opposite to rotation of the first ring gear 15*d*, on the spindle 15*c*1 of each first planetary gear 15*b* in the first planetary gear mechanism 15. This reaction force F coincides with the direction in which the wheel 9 is to be rotated. As a consequence, the load to be applied to the reduction gear unit can be decreased than the case in which the arrangement of the first planetary gear mechanism 15 and second planetary gear mechanism 16 is opposite to that in the reduction gear unit 14 in the travel assembly 7.

According to the drive assembly 7, the lube oil supplied to the wheel bearings 11,12 and reduction gear unit 14 is recovered, cooled and supplied again by the cooling circuit 20. The drive assembly 7 can, therefore, contribute to the prevention of malfunction or seizure of the reduction gear unit 14. Further, the cooled lube oil is supplied to the reduction gear unit 14. It is, therefore, unnecessary to rely upon the amount of lube oil to compensate for a deterioration in the lubrication performance of the lube oil due to overheating of the lube oil. This has made it possible to lower the level height of lube oil in which the reduction gear unit 14 is to be immersed, in other words, to reduce the amount of lube oil to be used for the lubrication of the reduction gear unit 14. Further, the lube oil can be effectively discharged to the side of the reduction gear unit 14 through the insertion hole 16c8 formed by the cylindrical extension 16c4 owing to the insertion of the discharge pipe 33 in the insertion hole 10b.

The construction of the cooling circuit 20 in the travel assembly 7 has been realized by the facilitation of insertion of the cylindrical extension 16c4, which is arranged on the second carrier 16c in the second planetary gear mechanism 16, into the spindle 10, because unlike conventional travel assemblies, it has become no longer necessary to arrange a retainer on a reduction gear unit-side end portion of the spindle for the arrangement of the support bearing owing to the arrangement of the support bearing 50 on the flange 10f and the location of the support bearing 50 on the side of the inner periphery of the spindle 10.

In the above-described embodiment, the spindle 10 has been formed by joining the chassis-side member 10c and reduction gear unit-side member 10d together by welding. In the present invention, however, the method of joining the chassis-side member and the reduction gear unit-side member together is not limited to welding. The chassis-side member and reduction gear unit-side member may be provided on outer peripheral walls thereof with mutually-facing flanges, and may be bolted together at the positions of the flanges. Further, the chassis-side member and reduction gear unit-side member may also be jointed together by rotary pressure welding.

As a matter of convenience for the space in which the suction pipe 26 and discharge pipe 33 of the cooling circuit 20 are arranged, the position of the flange 10f is set in the neighborhood of the center position of the space in the above-described embodiment. However, the present invention may be provided with no cooling circuit, and the position of the flange 10f may be set at a position where the support bearing 50 can be arranged at a center position in the range between the coupling 40 and the first sun gear 15a.

In the above-described embodiment, the support bearing 50 is fitted in the retainer 51 secured on the flange 10f, in other words, the support bearing 50 is arranged indirectly on the flange 10f. In the present invention, however, the support bearing may be arranged directly on the flange.

LEGEND

1 Dump truck
2 Chassis
3 Vessel
4 Front wheels
5 Rear wheels
6A,6B Tires
7 Travel assembly
8 Motors
9 Wheel
10 Spindle
10a Motor accommodating section
10b Shaft accommodating section
10c Chassis-side member
10d Reduction gear unit-side member
10d1 Oil inlet hole
10e Joint
10f Flange
11,12 Wheel bearings
13 Drive shaft
14 Reduction gear unit
15 First planetary gear mechanism
15a First sun gear
15b First planetary gears
15c First carrier
15c1 Spindle
15c2,15c3 Bearings
15d First ring gear
16 Second planetary gear mechanism
16a Second sun gear
16a1 Insertion hole
16b Second planetary gears
16c Second carrier
16c1 Spindle
16c2,16c3 Bearings
16c4 Cylindrical extension
16c5 First frusto-conical wall portion
16c6 Cylindrical wall portion
16c7 Second frusto-conical wall portion
16c8 Insertion hole
16d Second ring gear
17 Hub
17a,17b Bolts
18 Coupling
18a Bolts
19 Diesel engine
20 Cooling circuit
21 Oil cooler
22 Pump
23 Recovery oil passage
24 Intra-spindle recovery line
25 Extra-spindle recovery line
26 Suction pipe
26a Suction opening
27 Re-supply oil passage
28 Intra-spindle re-supply line
29 Extra-spindle re-supply line
30 Communication holes
31 Space
32 Space
33 Discharge pipe
33a Discharge opening
40 Coupling
50 Support bearing
51 Retainer
51a,51b Lines

The invention claimed is:

1. A travel assembly for a dump truck, said travel assembly comprising:
a wheel on which a tire is to be mounted, a spindle inserted on a side of an inner periphery of the wheel,
wheel bearings arranged between an outer peripheral wall of the spindle and an inner peripheral wall of the wheel to enable rotation of the wheel about the spindle,
a motor arranged on a side of an axial end of the spindle,
a drive shaft non-rotatably connected to an output shaft of the motor via a coupling, inserted on a side of an inner periphery of the spindle and extending out from an opposite axial end of the spindle,
a reduction gear unit arranged on a side of the opposite axial end of the spindle and interposed between the drive shaft and the wheel to transmit power from the drive shaft to the wheel, and a support bearing arranged on the spindle and supporting the drive shaft thereon, wherein:
the spindle is formed by a chassis-side member to be fixedly secured on a chassis of the dump truck and a reduction gear unit-side member located on a side closer to the reduction gear unit than the chassis-side member,
the reduction gear unit is provided with a first planetary gear mechanism including a sun gear connected to the drive shaft and a second planetary gear mechanism for transmitting power transmitted from the first planetary gear mechanism to the wheel, which includes a carrier non-rotatably connected to the opposite axial end of the spindle,
the first planetary gear mechanism and the second planetary gear mechanism are arranged in an order of the second planetary gear mechanism and the first planetary gear mechanism in an axial direction away from the spindle,
a flange configured to accommodate thereupon the support bearing, the flange being integrally formed on the reduction gear unit-side member by casting on an inner periphery of the reduction gear unit-side member, the flange being positioned either: i) proximate to a midpoint of a length of the drive shaft, or ii) at the midpoint of the length of the drive shaft, and
the support bearing supports the drive shaft at a portion thereof, the portion of the driveshaft being located between the coupling and the sun gear of the first planetary gear mechanism.

2. The travel assembly according to claim 1, wherein:
the spindle is formed, as an entirety thereof, of a motor accommodating section, which is of a substantially frusta-conical, hollow form tapered from the chassis toward the reduction gear unit and accommodates the motor inserted from a side of the output shaft thereof and a shaft accommodating section, which is of a substantially cylindrical form extending from an outboard end portion of the motor accommodating section in a direction toward the reduction gear unit and accommodates the drive shaft inserted and extending therethrough,
the wheel bearings is located on an outer peripheral wall of the shaft accommodating section,
the chassis-side member is a section of the entirety of the spindle including the motor accommodating section, and
the reduction gear unit-side member is a member of the shaft accommodating section, which is located on a side of the reduction gear unit relative to a position between the wheel bearings and the motor accommodating section.

3. The travel assembly according to claim 2, wherein:
insertion holes are formed extending in the axial direction through the carrier and a sun gear in the second planetary gear mechanism, respectively,
the drive shaft is non-rotatably connected to the sun gear in the first planetary gear mechanism in a state that the drive shaft is inserted and extending through the insertion holes,
a carrier in the first planetary gear mechanism is non-rotatably fixed relative to the wheel,
a ring gear in the first planetary gear mechanism is rotatable relative to the wheel and is non-rotatably connected to the sun gear in the second planetary gear mechanism,
the carrier in the second planetary gear mechanism is non-rotatably connected to the spindle, and
a ring gear in the second planetary gear mechanism is non-rotatably fixed relative to the wheel.

4. The travel assembly according to claim 3, wherein:
a cooling circuit is arranged to recover, cool and re-supply lube oil supplied to the wheel bearings and reduction gear unit,
the carrier in the second planetary gear mechanism has a cylindrical extension forming therein the insertion hole through which the spindle is inserted, and
the flange is provided with a suction pipe routed out from the side of the inner periphery of the spindle to a space on a side of the outer periphery of the spindle and on a side of the wheel bearings to recover the lube oil into the cooling circuit and a discharge pipe inserted in the insertion hole formed in the carrier in the second planetary gear mechanism to discharge the lube oil cooled by the cooling circuit.

5. The travel assembly according to claim 1, wherein:
insertion holes are formed extending in the axial direction through the carrier and a sun gear in the second planetary gear mechanism, respectively,
the drive shaft is non-rotatably connected to the sun gear in the first planetary gear mechanism in a state that the drive shaft is inserted and extending through the insertion holes,
a carrier in the first planetary gear mechanism is non-rotatably fixed relative to the wheel,
a ring gear in the first planetary gear mechanism is rotatable relative to the wheel and is non-rotatably connected to the sun gear in the second planetary gear mechanism,
the carrier in the second planetary gear mechanism is non-rotatably connected to the spindle, and
a ring gear in the second planetary gear mechanism is non-rotatably fixed relative to the wheel.

6. The travel assembly according to claim 5, wherein:
a cooling circuit is arranged to recover, cool and re-supply lube oil supplied to the wheel bearings and reduction gear unit,
the carrier in the second planetary gear mechanism has a cylindrical extension forming therein the insertion hole through which the spindle is inserted, and
the flange is provided with a suction pipe routed out from the side of the inner periphery of the spindle to a space on a side of the outer periphery of the spindle and on a side of the wheel bearings to recover the lube oil into the cooling circuit and a discharge pipe inserted in the insertion hole formed in the carrier in the second planetary gear mechanism to discharge the lube oil cooled by the cooling circuit.

* * * * *